United States Patent [19]

Schröder et al.

[11] Patent Number: 4,661,391

[45] Date of Patent: Apr. 28, 1987

[54] METHOD OF MAKING A MOULDED BODY OF FOAM PLASTICS MATERIAL

[75] Inventors: Ralph Schröder; Haps Despineux, both of Eupen, Fed. Rep. of Germany

[73] Assignee: Noel, Marquet & Cie. S.A., Eupen, Fed. Rep. of Germany

[21] Appl. No.: 684,019

[22] Filed: Dec. 20, 1984

[30] Foreign Application Priority Data

Mar. 2, 1984 [DE] Fed. Rep. of Germany ....... 3407737

[51] Int. Cl.$^4$ ...................... C08G 18/14; B29C 45/14; B29C 51/10
[52] U.S. Cl. .................................. 428/159; 264/46.4; 264/46.8; 264/259; 264/DIG. 83; 425/127; 425/129 R; 425/817 R; 428/160; 428/319.7
[58] Field of Search ..................... 264/46.8, 46.4, 259, 264/DIG. 83; 428/159, 160, 319.7; 425/127, 129 R, 817 R

[56] References Cited

U.S. PATENT DOCUMENTS

| 2,976,577 | 3/1981 | Gould | 264/46.8 X |
| 3,187,069 | 6/1965 | Pincus et al. | 264/46.8 |
| 3,258,511 | 6/1966 | McGregor, Jr. | 264/46.4 |
| 3,431,331 | 3/1969 | Pincus et al. | 264/46.8 X |
| 3,505,436 | 4/1970 | Krug et al. | 264/46.8 |
| 3,950,462 | 4/1976 | Shaffer et al. | 264/46.8 |
| 3,954,537 | 5/1976 | Alfter et al. | 264/46.8 X |

FOREIGN PATENT DOCUMENTS 56-164829 12/1981 Japan ................................. 264/46.8

Primary Examiner—Philip Anderson
Attorney, Agent, or Firm—Larson and Taylor

[57] ABSTRACT

The present invention relates to a method for the manufacture of moulded bodies such as cornices from foam plastics material, the visible side of these bodies being heavily textured or profiled, smooth, non-porous and free from separation elements, with a unit weight of less than 200 kg/m$^3$. In the method, a thin, elastic, heat-deformable film (3) is inserted between two heated mould portions (1, 2) in such a way that the film edges are clamped between the superimposed mould edges of the two mould portions (1, 2), a reactive, heat emitting, foaming plastics mixture is introduced through the upper mould portion (1) in such a way that it may be distributed on the film, and the hollow chamber formed between the film and the lower mould portion is evacuated during foaming, such that the film intimately conforms to the shape of the lower mould portion.

8 Claims, 3 Drawing Figures

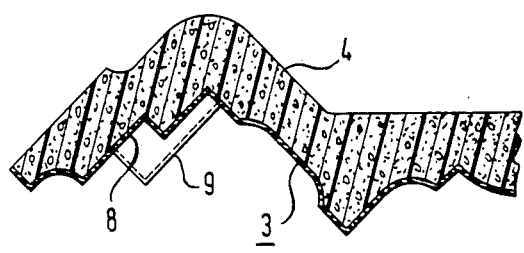
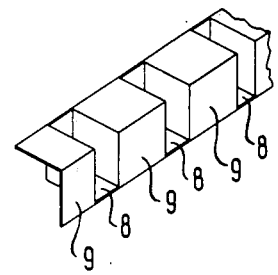
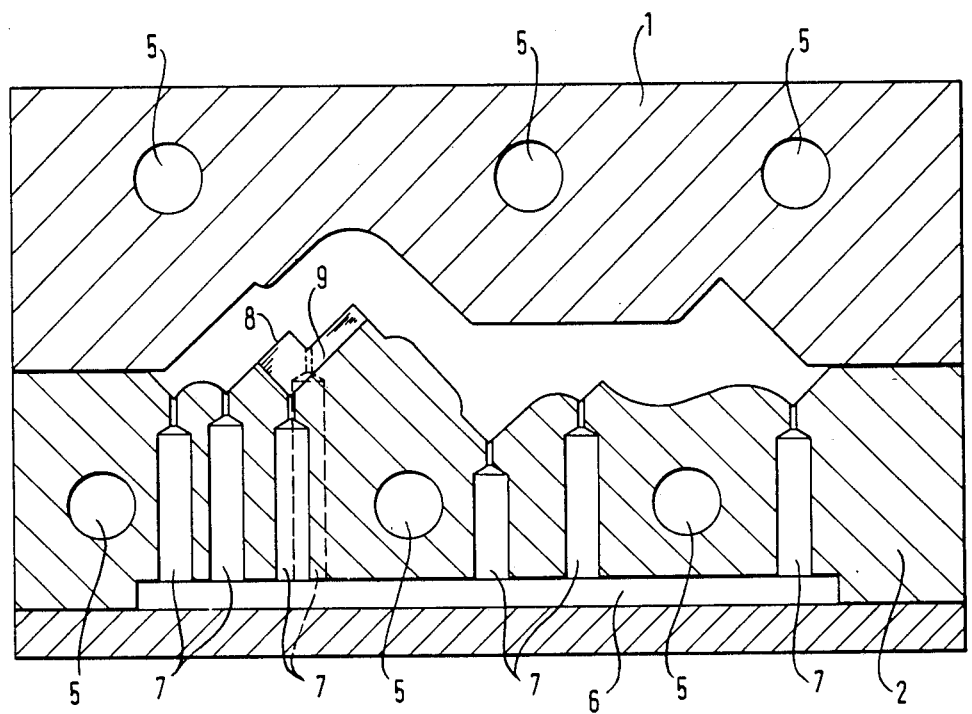

METHOD OF MAKING A MOULDED BODY OF FOAM PLASTICS MATERIAL

The present invention relates to a method of making a moulded body of foam plastics material, particularly but not exclusively where the visible side thereof is heavily textured or profiled, smooth and non-porous with a unit weight of less than 200 kg/m$^3$.

Moulded bodies of this type typically comprise cornices or like decorative profiled sections of a length of 2 m, which produce a stucco effect after they have been fixed at the join between a wall and a ceiling. Such moulded bodies have in the past been produced by introducing a plastics mixture to be foamed into a two-part mould provided with a separation medium therein. The mould parts are conventionally made from silicone rubber or from polyurethane elastomers. It has been observed that the moulds swell because they absorb fluid components from the foaming reaction mixture, and have to be regenerated after 10 mould openings. Also the dimensions of the moulded articles deviate to a considerable extent from the admissible measurement tolerances as a result of the swelling effect. Consequently, wastage of up to 15% is produced. Moreover, the maximum number of components which may be produced using these moulds is only approximately 250 to 300 per mould which has a detrimental effect on the price of the moulded body. In addition, the moulds made from silicone rubber or polyurethane elastomers are difficult to temper, which consequently makes reproduceable production difficult. Further moulds of this type cannot be de-aerated easily as a result of their softness, which leads to bubbles on the surface. It should also be noted that additional problems are caused by the use of separation means which are generally very difficult to remove from the mould body.

It might be thought possible to counter the latter two drawbacks by foaming into film which has previously been deep drawn. This is only possible, however, with relatively thick film, and the mould bodies obtained are heavily distorted since they are only laminated on one side. Thus, a method of this type is not suitable for the production of moulded bodies having a unit weight of less than 200 kg/m$^3$. Also a method of this type is expensive in terms of apparatus cost and power consumption.

In order to counter these drawbacks we have considered the possibility of using a very thin, elastic, heat-deformable film, which would remain elastic in the end product so as not to lead to any distortion of the mould body. The elastic, heat-deformable film would be clamped between two mould portions and the plastics mixture to be foamed introduced through the upper mould portion such that the film is pressed by the mixture to be foamed against the lower mould portion. This method is only successful, as tests carried out by the applicants have shown, with foam plastics mixtures producing moulded bodies with a unit weight of more than 500 kg/m$^3$, as it is only mixtures to be foamed of this type which produce the foam pressure required to press the film accurately into fine textured contours of the mould.

With a view to overcoming the aforesaid difficulties and drawbacks the present invention provides a method of making a moulded body of foam plastics material, comprising providing a thin heat deformable film between two portions of a mould,
providing foaming plastics material in a space between a first of the mould portions and the film,
producing a partial vacuum between the film and the second of the mould portions,
and causing the film to become heated such that the film is urged by the partial vacuum and by pressure of the foaming material into intimate contact with the second mould portion.

The invention therefore provides a method which enables the production of longitudinal or round, nondistorted, moulded bodies having a unit weight of less than 200 kg/m$^3$, whose visible sides have an accurately produced surface which is heavily textured or profiled, smooth, bubble-free and has no separation elements. In addition, the method is designed to enable the production, using a mould which has an upper and a lower mould portion, of up to one million moulded articles, with a wastage of less than 2%.

In a preferred form, the invention provides a combination of features which comprise the use of a thin, elastic, heat-deformable film, which retains or recovers its elasticity after moulding, in the use of a foaming plastics mixture which emits heat for the additional heating of the film as well as the use of a tempered mould device and the evacuation of the hollow chamber formed between the film and the lower mould portion, for the purposes of supporting the deformation of thin, elastic, heat-deformable film by the foaming pressure.

The invention therefore relates to a method for the manufacture of mould bodies from foam plastics, the visible side of these bodies being heavily textured profiled, smooth, non-porous and free from separation elements and having a unit weight of less than 200 kg/m$^3$ which is characterised in that (a) a thin, elastic, heat-deformable film is inserted between two heated mould portions in such a way that the film edges are clamped between the superimposed mould edges of the two mould portions, (b) a reactive, heat emitting, foaming plastic mixture is introduced through the upper mould portion in such a way that it may be distributed on the film, and (c) the hollow chamber formed between the film and the lower mould portion is evacuated during foaming, so that the film which is heated both by the heated mould portions and by the heat of reaction given off by the reaction mixture is pressed by the foam pressure together with the vacuum provided so that its contours accurately fit the heavily textured or profiled mould surface of the lower mould portion.

For the purposes of the invention any thin elastic or ductile, heat-deformable plastics film, which has an elastic or ductile nature after moulding, is suitable. Film having a thickness of 180 to 200 μm is preferred, and in particular film of this type made from soft polyvinyl chloride.

Whilst carrying out the method, the mould device, or the two mould portions, is kept at a temperature of 55° to 65° C. For this purpose, the mould portions are provided with passages through which a corresponding heated medium flows.

Mixtures known to persons skilled in the art are suitable for use as foaming plastics mixtures for the purposes of the invention. Two component mixtures which produce a polyurethane hard foam are particularly preferred as foaming plastics mixtures. Similarly, use may also be made of epoxy resin foams or phenol resin foams. With respect to the production of hard polyurethane foams, reference should be made to the 'Kunststoffhandbuch' (Plastics handbook), Vol.V11, Polyurethane, by Vieweg/Hoechtlen (Karl Hanser-Verlag, Munich 1966) and to the references given therein.

In order that the invention may be more fully understood an embodiment thereof will now be described by way of illustrative example with reference to the accompanying drawings wherein:

FIG. 1 is a cross-sectional view of a moulded body in the form of a cornice, made by a method according to the invention;

FIG. 2 is a schematic perspective view of a pattern of recesses and projections which runs along the length of the cornice, and FIG. 3 is a schematic cross-sectional view of a two part mould for moulding the cornice shown in FIG. 1

In the Figures, the reference numerals have the following significance:
1. Upper mould portion
2. Lower mould portion
3. Film
4. Foam
5. Heating ducts
6. Vacuum chamber
7. Vacuum nozzles
8. Recesses
9. Projections FIG. 1 shows a cross section through an ornamental profiled section moulded body in the form e.g. of a cornice, made from plastics foam 4, typically a hard polyurethane foam as aforesaid, and a heat deformable plastics film 3, typically of P.V.C. as aforesaid. Recesses 8 and projections 9 are disposed along the length of the body as shown schematically in Fig. 2. The recess 8 and the projection 9 shown in Fig. 1 do not lie in the same cross-sectional plane, but behind one another. The recesses 8 and the projections 9 may be formed as shown in outline in Fig. 2 and may be ornaments.

FIG. 2 is a diagrammatic perspective view of the recesses 8 and the projections 9, wherein it can be seen that these recesses and projections may have the form of ornaments.

FIG. 3 is a cross-section through the mould device, which comprises an upper mould portion 1 and a lower mould portion 2 which are each provided with the heating ducts 5. The mould portion 2 is provided with a surface pattern which defines the recesses 8 and projections 9, together with the rest of the ornamental pattern for the cornice. The lower mould portion 2 also in use defines a vacuum chamber 6 and has vacuum nozzles 7, which are connected to a vacuum source(not shown).

To make the moulded body, the two mould portions 1,2 which are preferably of cast aluminum or a different metal or alloy are initially seperated from one another They are brought to the required temperature, typically 55°-65° C. by passing a heated fluid through the ducts 5. A thin, highly elastic plastics deformable film (i.e. the film 3)is inserted between the mould portions 1,2 such as to overlie the lower mould portion. The mould portions 1 and 2 are then brought together such that the film 3 is sandwiched between edge regions of the portions. Then, plastics foam mixture is injected into the mould into a space between the upper mould portion 1 and the film 3, such as to be distributed over the film. After the predetermined starting time the mixture begins to foam and is thereby distributed throughout the mould. The heat of reaction of the foaming material and also the heat from the mould portions 1, 2 causes softening of the film 3. After distribution, i.e. when the mould is full of foam, an overpressure is created. This overpressure presses the film 3 onto the mould surface of the lower mould member 2. Components produced solely in this way do not have sharply defined edges, in particular in the case of deep recesses. In order to prevent or solve this, a vacuum is provided between the lower mould portion 2 and the film 3 whilst the foam pressure is rising in the mould. This partial vacuum helps to bring the film into contact with the mould in all areas and corners. The vacuum therefore aids the foam pressure during simultaneous uniform foaming in causing intimate contact of the film 3 with the lower mould portion surface. As the film lies flat, in the first instance, in the mould and assumes the mould contours as a result of the foam pressure, the formation of air bubbles on the surface is completely avoided. In addition, the film also acts as a separation layer (between the foam and the lower mould portion). Further, the film 3 can provide a final surface ornamentation, for example in the form of different colours, or as a printed wood grain imitation, for different types of decor.

A two component system as aforesaid for the production of polyurethane hard foam is used as the foaming mixture and the resulting moulded body has a unit weight of less than 200 kg/m$^3$.

Long decorative profiled sections such as cornices, and also rosettes and dadoes may be produced in the manner described above.

We claim:
1. A method fo making molded article of foam plastic material with a complicated sharp textured surface profile structure, which is smooth, non-porous and free from mold release agent, comprising the following steps:
   (a) a thin, elastic, heat-deformable film is inserted between two heated mold portions so that the film edges are clamped between the superimposed mold edges of the two mold portions and the film lies flat between both mold portions,
   (b) a reactive, heat emitting, foaming plastic mixture is introduced through the upper mold portion and distributed on the film, and
   (c) the hollow chamber formed between the film and the lower mold portion is evacuated during foaming, so that the film which is heated both by the heated mold portions by heat radiation and by the heat of reaction given off by the reaction mixture is pressed by the foam pressure together with the vacuum provided so that its contours accurately fit the complicated textured or profiled mold surface of the lower mold portion.

2. A method according to claim 1 wherein the moulded body has, by contact with the second mold member a heavily textured or profiled, smooth nonporous surface.

3. A method according to claim 1 wherein the moulded body is of a density of less than 200 kg/m$^{-3}$.

4. A method according to claim 1 wherein the film is of a thickness of 180-250 um.

5. A method according to claim 1 wherein the film is of soft polyvinyl chloride.

6. A method according to claim 1 wherein the two mould portions are heated to 55° to 65° C.

7. A method according to claim 1 wherein said foaming plastics material comprises a two component mixture producing a hard polyurethene foam.

8. A moulded body produced by the method of claim 1.

* * * * *